(12) United States Patent
Chan et al.

(10) Patent No.: US 12,536,976 B2
(45) Date of Patent: Jan. 27, 2026

(54) PROTOCOL CONVERSION CIRCUIT AND PROTOCOL CONVERSION METHOD

(71) Applicant: REALTEK SEMICONDUCTOR CORP., Hsinchu (TW)

(72) Inventors: Chun-Chieh Chan, Hsinchu (TW); Hung-Shao Chen, Hsinchu (TW); Tai-Jung Wu, Hsinchu (TW); Wen-Hsia Kung, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 157 days.

(21) Appl. No.: 18/637,583

(22) Filed: Apr. 17, 2024

(65) Prior Publication Data

US 2024/0420661 A1 Dec. 19, 2024

(30) Foreign Application Priority Data

Jun. 19, 2023 (TW) .................. 112122869

(51) Int. Cl.
*G09G 5/00* (2006.01)
*H04L 69/08* (2022.01)

(52) U.S. Cl.
CPC ............ *G09G 5/005* (2013.01); *H04L 69/08* (2013.01); *G09G 2340/12* (2013.01); *G09G 2340/14* (2013.01); *G09G 2360/127* (2013.01); *G09G 2370/10* (2013.01)

(58) Field of Classification Search
CPC ........... G09G 5/005; G09G 2340/0435; G09G 2340/12; G09G 2340/125; G09G 2340/14; G09G 5/003; G09G 2360/127; G09G 2360/06; G09G 2370/10; G09G 2370/12; G09G 5/393; G09G 5/395; G06T 1/20; H04L 69/08

See application file for complete search history.

(56) References Cited

U.S. PATENT DOCUMENTS

2022/0223098 A1* 7/2022 Koo ..................... G09G 3/2096

* cited by examiner

*Primary Examiner* — Hau H Nguyen
(74) *Attorney, Agent, or Firm* — Li & Cai Intellectual Property (USA) Office

(57) ABSTRACT

A protocol conversion circuit and a protocol conversion method are provided. The protocol conversion circuit includes a DisplayPort™ (DP) receiver, a control analysis circuit, a downstream transmitter and a frame buffer. The DP receiver analyzes a DP signal to obtain video data and packet information. The control analysis circuit determines whether the packet information indicates that a live function or a panel replay (PR) function is activated, and controls, in response to determining that the live function is activated, the frame buffer to store received current video data and transmits it to the downstream transmitter; and controls the frame buffer to discard the received current video data, or update previous video data stored in the frame buffer with a specified range in the current video data, and sends latest video data to the downstream transmitter, so as to output a target signal to the second electronic device.

18 Claims, 3 Drawing Sheets

PROTOCOL CONVERSION CIRCUIT AND PROTOCOL CONVERSION METHOD

CROSS-REFERENCE TO RELATED PATENT APPLICATION

This application claims the benefit of priority to Taiwan Patent Application No. 112122869, filed on Jun. 19, 2023. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a circuit and a method, and more particularly to a protocol conversion circuit and a protocol conversion method.

BACKGROUND OF THE DISCLOSURE

A function called Panel Replay is declared in the existing DisplayPort™ (DP) standard, which allows a DP sink display to operate in two different modes. One of them is a live mode that plays video data currently provided by a video source in real time, and the other is a panel replay (PR) mode that plays video data stored in an internal buffer.

Although this technique can save power effectively in specific scenarios, since such a function is dedicated to an ecological chain of DP-related products, products with other specifications cannot share advantages provided thereby.

SUMMARY OF THE DISCLOSURE

In response to the above-referenced technical inadequacies, the present disclosure provides a protocol conversion circuit and a protocol conversion method capable of extending the Panel Replay function to products beyond those using the DisplayPort specification.

In one aspect, the present disclosure provides a protocol conversion circuit, including a DisplayPort (DP) signal receiver, a control analysis circuit, a downstream transmitter and a frame buffer. The DP signal receiver receives a DP signal from a first electronic device, and is configured to analyze the DP signal to obtain video data and packet information. The control analysis circuit is configured to determine whether the packet information indicates to activate a live function or a panel replay (PR) function. The downstream transmitter is connected to a second electronic device. The frame buffer receives the video data. In response to determining that the live function is activated, the control analysis circuit is configured to execute a preset live process to control the frame buffer to store current video data received by the frame buffer, and simultaneously send the current video data to the downstream transmitter. In response to determining that the PR function is activated, the control analysis circuit is configured to execute a preset PR process, including: controlling the frame buffer to discard the received current video data, or to update the previous video data stored in the frame buffer with content within a specified range of the current video data; and controlling the frame buffer to transmit latest video data stored therein to the downstream transmitter. When the live broadcast function is activated, the downstream transmitter is configured to convert the current video data from the frame buffer into a target signal in a target format and outputs the target signal to the second electronic device, and when the PR function is activated, the downstream transmitter is configured to convert the latest video data from the frame buffer into the target signal in the target format and output the target signal to the second electronic device.

In another aspect, the present disclosure provides a protocol conversion method, including: configuring a display port (DP) signal receiver to receive a DP signal from a first electronic device, and analyze the DP signal to obtain video data and packet information; configuring a frame buffer to receive the video data; configuring a control analysis circuit to perform the following steps: determining whether the packet information indicates to activate a live function or a panel replay (PR) function; in response to determining that the live function is activated, executing a preset live process to control the frame buffer to store current video data received by the frame buffer, and simultaneously send the current video data to a downstream transmitter; in response to determining that the PR function is activated, executing a preset PR process, including: controlling the frame buffer to discard the received current video data, or to update previous video data stored in the frame buffer with content within a specified range of the current video data; and controlling the frame buffer to transmit latest video data stored therein to the downstream transmitter. The method further includes: configuring the downstream transmitter to, when the live broadcast function is activated, convert the current video data from the frame buffer into a target signal in a target format and output the target signal to the second electronic device, and configuring the downstream transmitter to, when the PR function is activated, convert the latest video data from the frame buffer into the target signal in the target format and output the target signal to the second electronic device.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
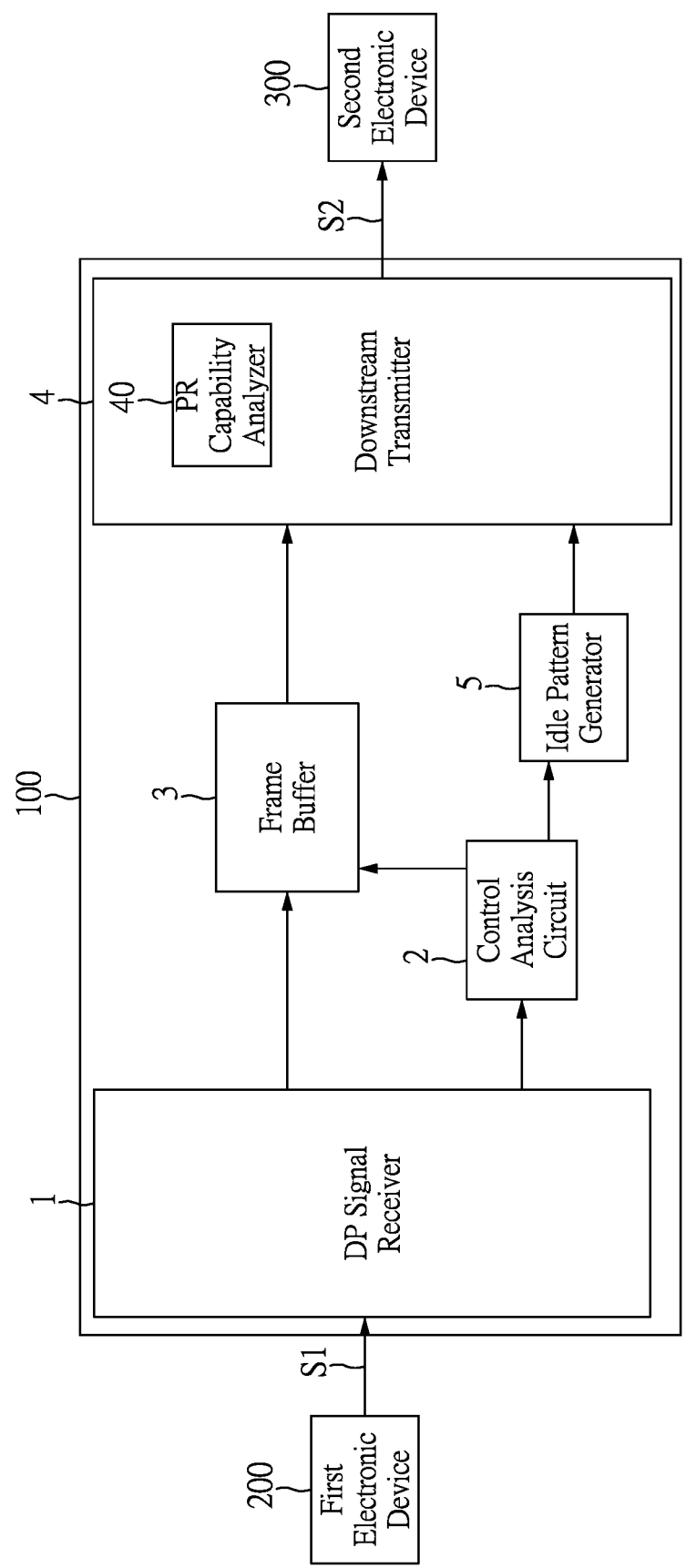
FIG. 1 is a functional block diagram of a protocol conversion circuit according to one embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

FIG. 1 is a functional block diagram of a protocol conversion circuit according to one embodiment of the present disclosure. With reference to FIG. 1, one embodiment of the present disclosure provides a protocol conversion circuit 100, which can include a DisplayPort (DP) signal receiver 1, a control analysis circuit 2, a frame buffer 3, a downstream transmitter 4 and an idle pattern generator 5, and each of them can be implemented by a processing circuit including a processor and a memory. The protocol conversion circuit 100 is electrically connected between the first electronic device 200 and the second electronic device 300, the first electronic device 200 can be, for example, a general-purpose computer supporting the DP specification, and the second electronic device 300 can be, for example, a computer that does not support the DP specification, for example, display only support specifications such as HDMI/VGA. Therefore, the protocol conversion circuit 100 is needed to convert a format of the video signal.

The DP signal receiver 1 can receive a DP signal S1 from the first electronic device 200 and is configured to analyze the DP signal S1 to obtain video data and packet information. Specifically, the first electronic device 200 is a source device, and the DP signal receiver 1 can be used to receive the DP signal S1 transmitted from the first electronic device 200. In some embodiments, the DP signal receiver 1 can include an 8/10b decoder complying with the DP1.4 specification and a 128/132b decoder complying with the DP2.0 specification. In addition, the DP signal receiver 1 not only can perform video transmission by single stream transport (SST) mode supported by a general DP source device, but also support applications utilizing multi-stream transport (MST).

Through the above-mentioned decoders, the DP signal receiver 1 can analyze the received DP signal S1 to obtain video data and packet information, the video data will be transmitted to the frame buffer 3, and the packet information will be sent to the control analysis circuit 2 for subsequent logic determination processing. The packet information can be, for example, a video stream configuration secondary data packet (VSC SDP) located in a blanking region of the DP signal S1, but the present disclosure is not limited thereto.

It should be noted that the packet information can be used to indicate whether the first electronic device 200 is to operate in a live mode or a panel replay (PR) mode. For example, such indication can be made by the source device (such as the first electronic device 200) through PR_STATE and Update_RFB fields of the VSC SDP.

According to the DP specification, in the live mode, the sink device not only plays the video data sent by the source device by a panel, but also stores the video data of each frame in the buffer (which can be determined by the source device), such that the video data previously stored in the buffer can be played when the source device is switched to the PR mode.

In more detail, the PR mode includes two replay modes: entire frame replay and selective update. The former means that the sink device can perform panel replay for the entire frame to be displayed. The latter means that the source device instructs the sink device to perform live streaming in a specified range of the frame to be displayed, while playing frames stored in the buffer in the rest of the frame to be displayed. In this way, advantages of partial updates can be achieved. In addition, in the selective update, the specified range to be updated in each frame to be displayed is not limited to a single region. For example, the frame buffer 3 can receive video data from a plurality of regions designated by the source device to be selectively updated, and dynamically update and push each frame accordingly.

In more detail, during the selective update, the DP signal receiver 1 synchronously updates the received video data corresponding to the specified range to a corresponding range in the buffer, and a content that is finally displayed in the specified range can be frames directly transmitted by the source device. Therefore, a main purpose of the present disclosure is to extend the above-mentioned live function and two panel replay functions to products complying with non-DP specifications.

It should be noted that, to inform the source device that the protocol conversion circuit 1 can support the panel replay related functions, when the DP signal receiver 1 is electrically connected to the first electronic device 200, the DP signal receiver 1 can be configured to perform a first handshake process with the first electronic device 200 to inform the first electronic device 200 that the protocol conversion circuit 100 supports the PR function under the DP specification. When the first electronic device 200 is informed that the protocol conversion circuit 100 supports the PR function, a packet indicating to enable the live function or the PR function can then be appended in the DP signal S1.

That is, before transmitting the DP signal S1 including valid information such as video and audio data, the source device (first electronic device 200) can access DP configuration data (DPCD) through pins (e.g., AUX pin) to exchange information before sending the signal. This message exchange can include the handshake process and DP link training process related to the Panel Replay function, which basically follows the DP specification and will be omitted hereinafter.

Further referring to FIG. 1, the control analysis circuit 2 can be electrically connected to the DP signal receiver 1, the frame buffer 3 and the downstream transmitter 4.

To smoothly expand the PR function, the frame buffer 3 is provided on a transmission path of the video data, and can store or update the entire frame or a specific range of the frame in the input video data. The frame buffer 3 can be realized by any memory or storage unit, such as DDR, SRAM and other memories. The frame buffer 3 is controlled by the control analysis circuit 2, to determine a content to be output to the downstream transmitter 4, or to update the video data stored therein with the received video data.

For clarity, the downstream transmitter 4 is first described below. The downstream transmitter 4 is connected to the second electronic device 300, and is mainly used to transmit video signals of various output interfaces (such as HDMI, VGA, etc.) and packet information including audio data and other auxiliary information to a downstream device (that is, the second electronic device 300). The downstream transmitter 4 obtains the video data to be transmitted from the frame buffer 3 or the idle pattern generator mentioned hereinafter. It should be noted that although only one downstream transmitter 4 is shown in FIG. 1, a quantity of the downstream transmitter 4 can be determined according to a quantity of downstream devices to be connected to the protocol conversion circuit 100. Therefore, a quantity of output ports of the protocol conversion circuit 100 can be one or more, and the quantity of the downstream transmitter 4, corresponding to the quantity of output ports, can also be one or more.

When the downstream transmitter 4 is connected to the second electronic device 300, the downstream transmitter 4 performs a second handshake process with the second electronic device 300 to obtain device information related to the second electronic device 300, such as device type, manufacturer, support resolutions and support capabilities.

For example, the downstream transmitter 4 further includes a PR capability analyzer 40 configured to obtain extended display capability identification data (EDID) and status and control data channel (SCDC) data of the second electronic device 300.

Therefore, the packet information (for example, the VSC SDP information) analyzed by the DP signal receiver 1 and the device information analyzed by the PR capability analyzer 40 will be further input into the control analysis circuit 2 for analysis, so as to determine an arbitration instruction corresponding to the live function or the RP function. The arbitration instruction can be used to control the frame buffer 3 and the idle pattern generator 5 mentioned hereinafter.

Figure 2:
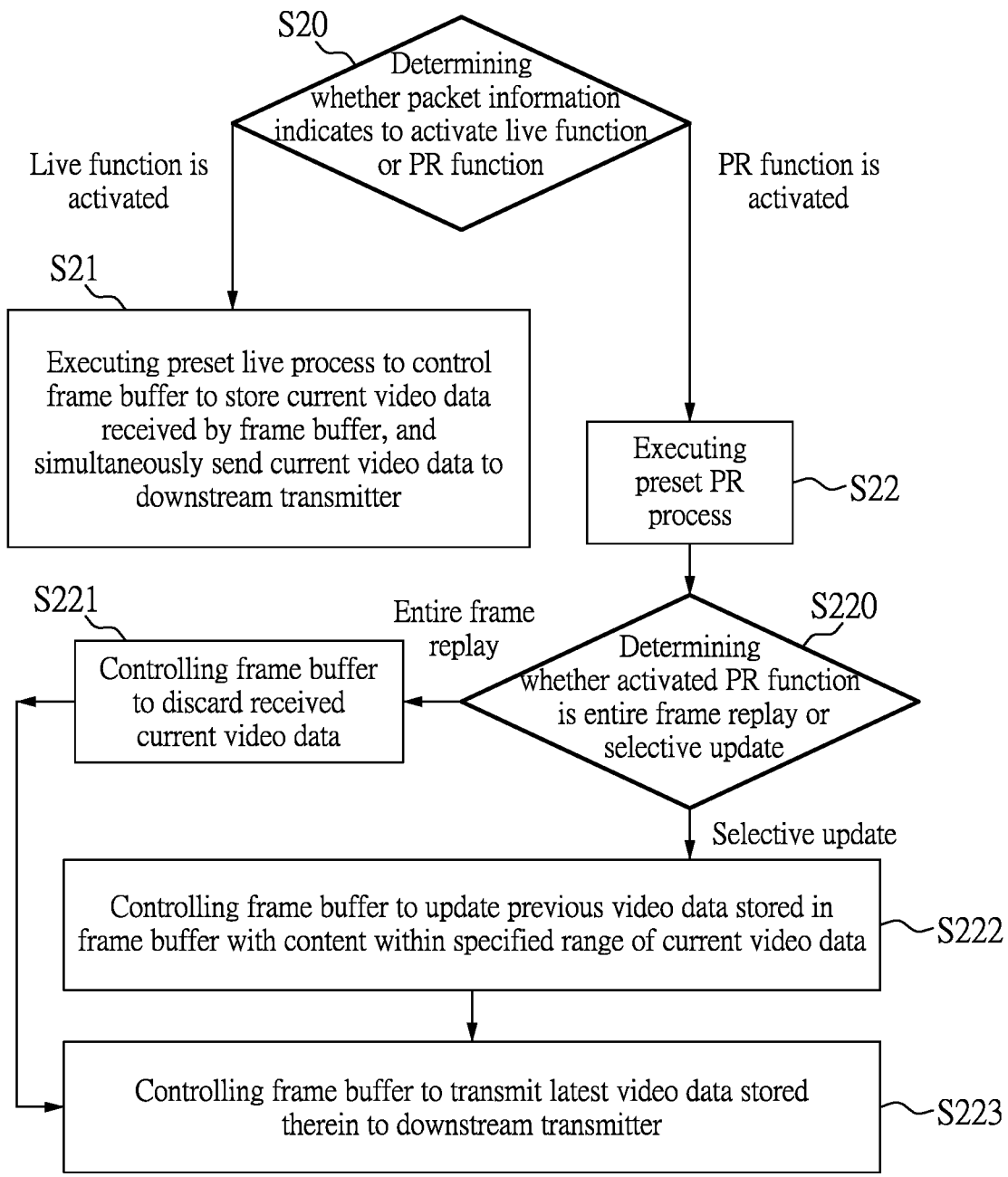
FIG. 2 is a flowchart of a control process of a control analysis circuit according to one embodiment of the present disclosure.

It should be noted that the present disclosure further provides a protocol conversion method, which is applicable to the protocol conversion circuit 100 mentioned in the foregoing embodiments. For clarity, repetitive details will be omitted hereinafter, and the description below will focus on the process in which the control analysis circuit 2 participates in the protocol conversion method. FIG. 2 is a flowchart of a control process of a control analysis circuit 2 according to one embodiment of the present disclosure.

As shown in FIG. 2, the control process includes configuring the control analysis circuit 2 to perform the following steps:

Step S20: determining whether the packet information indicates to activate the live function or the PR function.

In response to determining that the live function is activated in step S20, the control process proceeds to step S21: executing a preset live process to control the frame buffer to store current video data received by the frame buffer, and simultaneously send the current video data to a downstream transmitter. The stored current video data will be transformed into previous video data as time goes by, and thus the previous frame can be provided for the replay mechanism of the PR function.

In response to determining that the PR function is activated in step S20, the control process proceeds to step S22: executing a preset PR process.

As shown in FIG. 2, the preset PR process includes the following steps:

Step S220: determining whether the activated PR function is the entire frame replay or the selective update.

In response to determining that the activated PR function is the entire frame replay, the control proceeds to step S221: controlling the frame buffer to discard the received current video data.

In response to determining that the activated PR function is the selective update, the control process proceeds to step S222: controlling the frame buffer to update previous video data stored in the frame buffer with content within a specified range of the current video data. In the selective update, the source device (the first electronic device 200) can, for example, specifically set a live range and a specific replay range from a frame through a coordinate indication field in the VSC SDP.

After step S221 or step S222 is performed, the control process proceeds to step S223: controlling the frame buffer to transmit latest video data stored therein to the downstream transmitter.

That is, if the PR function is the entire frame replay, the previous video data (or a previous frame corresponding thereto) stored in the frame buffer 3 is the latest video data stored, and if the PR function is the selective update, the video data in which the live range has been updated is taken as the latest stored video data. In this case, the frame buffer 3 discards the current video data received.

Therefore, the downstream transmitter 4 can convert the current video data from the frame buffer 3 into the target signal S2 in the target format and output the target signal S2 to the second electronic device 300 when the live function is activated. When the PR function is activated, the downstream transmitter 4 is configured to convert the latest video data from the frame buffer 3 into the target signal S2 in the target format and output the target signal S2 to the second electronic device 300.

Therefore, by executing the control process, the PR function can be extended to the second electronic device 300 complying with non-DP specification. That is, the PR function can still work for architectures in which the source device (the first electronic device 200) complied with the DP specification is connected to the second electronic device 300 complied with the non-DP specification through the protocol conversion circuit 100 of the present disclosure, so as to achieve power saving and flexibility.

On the other hand, in the protocol conversion circuit 100 of the present disclosure, different signal transmission mechanisms are designed for specific-type devices. For example, the downstream transmitter 4 can determine whether or not the second electronic device 300 is a specific-type device according to device information from the second electronic device 300. More precisely, the PR capability analyzer 40 can be configured to determine whether or not the second electronic device 300 is the specific-type device according to the EDID and/or SCDC data in the second handshake process.

In response to the PR capability analyzer 40 determining that the second electronic device 300 is not the specific type device, the control analysis circuit 2 is configured to perform the control process of FIG. 2.

Figure 3:
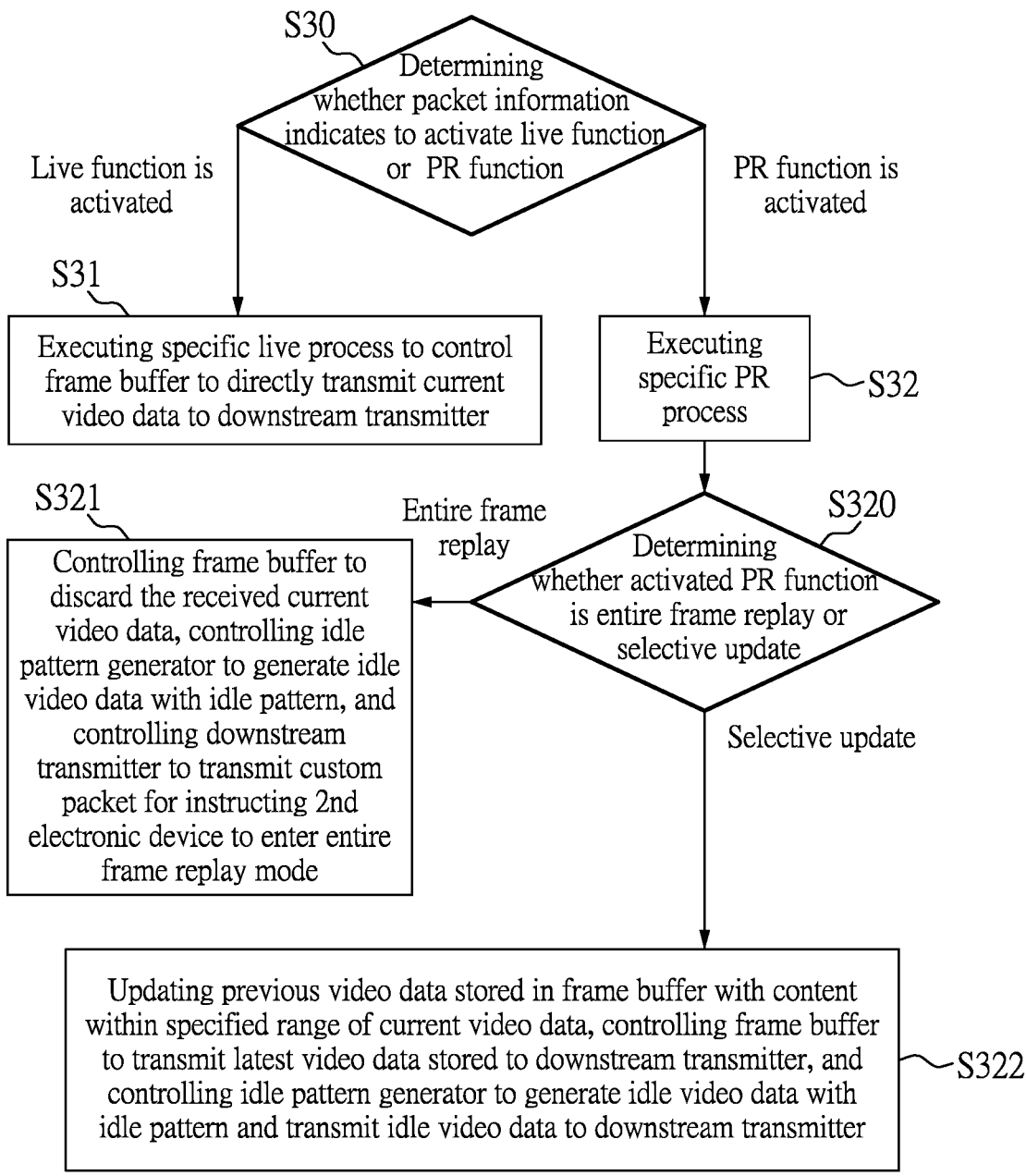
FIG. 3 is another flowchart of the control process of the control analysis circuit according to one embodiment of the present disclosure.

Reference is made to FIG. 3, which is another flowchart of the control process of the control analysis circuit according to one embodiment of the present disclosure. In response to the PR capability analyzer 40 determining that the second electronic device 300 is the specific type device, the control analysis circuit 2 is configured to perform the control process of FIG. 3. It should be noted that when the second electronic device 300 is the specific type device, the second electronic device 300 is an electronic device complied with the non-DP specification and has another built-in frame buffer, which can be used to implement the PR function.

The control process of FIG. 3 includes the following steps:

Step S30: determining whether the packet information indicates to activate the live function or the PR function.

In response to determining that the live function is activated in step S30, the control process proceeds to step S31: executing a specific live process to control the frame buffer to directly transmit the current video data to the downstream transmitter. Different from the foregoing embodiments, in step S31, the frame buffer 4 does not store the current video data, that is, the frame buffer 4 does not need to provide the previous frame for replay mechanism of the PR function.

In response to determining that the PR function is activated in step S20, the control process proceeds to step S32: executing a specific PR process.

Further referring to FIG. 1, the protocol conversion circuit 100 further includes the idle pattern generator 5. The idle pattern generator 5 is configured to generate idle video data with an idle pattern according to resolution horizontal information and vertical information provided by the DP source device (the first electronic device 200), and transmit the idle video data to the downstream transmitter 4. Whether to output the idle pattern depends on the arbitration indication generated by the control analysis circuit 2.

As shown in FIG. 3, the specific PR process includes the following steps:

Step S320: determining whether the activated PR function is the entire frame replay or the selective update.

In response to determining in step S320 that the activated PR function is the entire frame replay, the control process proceeds to step S321: controlling the frame buffer to discard the received current video data, controlling the idle pattern generator to generate idle video data with the idle pattern, and controlling the downstream transmitter to transmit a custom packet for instructing the second electronic device 300 to enter the entire frame replay mode.

Reference is made to FIG. 1 again, in response to determining that the activated PR function is the selective update in step S320, the control process proceeds to step S322: updating the previous video data stored in the frame buffer with content within a specified range of the current video data, controlling the frame buffer to transmit the latest video data stored to the downstream transmitter, and controlling the idle pattern generator to generate idle video data with an idle pattern and transmit the idle video data to the downstream transmitter. That is, in the selective update in FIG. 3, the source device (the first electronic device 200) can specifically set a live range and a replay range from a frame to be displayed through the coordinate indication field in the VSC SDP. The replay range is filled by the idle pattern, and the live range is updated with the content within the specified range in the current video data.

After step S322 is performed, the downstream transmitter 4 obtains the video data to be transmitted from the frame buffer 3 and the idle pattern generator 5, and converts the video data to be transmitted into the target signal S2 in the target format and outputs the target signal S2 to the second electronic device 300. At the same time, the downstream transmitter 4 is also controlled by the control analysis circuit 2 to generate the custom packet instructing the second electronic device 300 to enter the selective update mode. Therefore, power consumption of the protocol conversion circuit 100 can be reduced when only the idle video data with the idle pattern is transmitted. In some embodiments, the idle pattern can be implemented in manners other than transmitting video data. For example, the idle pattern generator 5 can generate a minimum power consumption signal, and such signal can be a digital signal capable of maintaining physical links between a transmitting terminal and a receiving terminal. The second electronic device 300 can generate a video signal by itself in response to receiving the minimum power consumption signal.

When the second electronic device 300 receives the custom packet instructing to enter the entire frame replay mode, a previous frame stored in another built-in frame buffer can be output. When the second electronic device 300 receives the custom packet with instructions to enter the selective update mode, the second electronic device 300 can update the previous frame stored in the another built-in frame buffer with the video data in the target signal S2 outside the region of the idle pattern, and display the updated video data. It should be noted that the above-mentioned custom packet can be, for example, a SONY/PHILIPS digital interconnect format (S/PDIF) or an HDMI vendor-specific information frame (VSIF) packet. In this way, the downstream transmitter 4 can instruct an operation mode required by the specific type device to achieve a replay function that is similar to the PR function of the DP specification.

In other embodiments, for some specific type devices with specific interfaces, a low frequency periodic signaling (LFPS) mechanism can be used to enable the downstream transmitter 4 to not transmit the video signal within a time interval that the idle video data with the idle pattern is generated by the idle pattern generator 5 and when the PR function is the entire frame replay. Therefore, for the specific type device, relevant circuits of the video receiving terminal can be in a sleep state, until the downstream transmitter 4 is required to send effective video content (that is, the source device instructs to start the live mode or the PR function is switched to the selective update), the downstream transmitter 4 can be controlled to transmit an LFPS wake-up signal in advance, so as to wake up the relevant circuits of the video receiving terminal of the specific type device. Therefore, the protocol conversion circuit and the specific type device can operate in a more power-saving way.

Beneficial Effects of the Embodiments

In conclusion, in the protocol conversion circuit and protocol conversion method provided by the present disclosure, the PR function can be extended to the second electronic device complied with the non-DP specification, such that the PR function still works for architecture in which the source device complied with the DP specification is connected to an electronic device complied with a non-DP specification through the protocol conversion circuit of the present disclosure, so as to achieve power saving and flexibility.

Furthermore, in the protocol conversion circuit and protocol conversion method provided by the present disclosure, different video data transmission processes are designed for specific type devices, so that there is no need to store video data in the live mode and the entire frame replay mode, and only the video data within the live range is stored in the selective update. Therefore, less power is required by the protocol conversion circuit and the specific-type device is able to operate in a more power-saving way.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A protocol conversion circuit, comprising:
   a display port (DP) signal receiver receiving a DP signal from a first electronic device, wherein the DP signal receiver is configured to analyze the DP signal to obtain video data and packet information;
   a control analysis circuit configured to determine whether the packet information indicates to activate a live function or a panel replay (PR) function;
   a downstream transmitter connected to a second electronic device; and
   a frame buffer receiving the video data, wherein, in response to determining that the live function is activated, the control analysis circuit is configured to execute a preset live process to control the frame buffer to store current video data received by the frame buffer, and simultaneously send the current video data to the downstream transmitter;
   wherein, in response to determining that the PR function is activated, the control analysis circuit is configured to execute a preset PR process, including:
      controlling the frame buffer to discard the received current video data, or to update the previous video data stored in the frame buffer with content within a specified range of the current video data; and
      controlling the frame buffer to transmit latest video data stored therein to the downstream transmitter;
   wherein, when the live broadcast function is activated, the downstream transmitter is configured to convert the current video data from the frame buffer into a target signal in a target format and outputs the target signal to the second electronic device, and when the PR function is activated, the downstream transmitter is configured to convert the latest video data from the frame buffer into the target signal in the target format and output the target signal to the second electronic device.

2. The protocol conversion circuit according to claim 1, wherein, in response to the DP signal receiver being connected to the first electronic device, the DP signal receiver is configured to perform a first handshake process with the first electronic device to indicate that the first electronic device supports the PR function under DP specification.

3. The protocol conversion circuit according to claim 1, wherein, in response to the downstream transmitter being connected to the second electronic device, the downstream transmitter is configured to perform a second handshake process with the second electronic device, and determine, according to device information from the second electronic device, whether or not the second electronic device is a specific type device.

4. The protocol conversion circuit according to claim 3, wherein, in response to determining that the second electronic device is the specific type device and determining that the live function is activated, the control analysis circuit is configured to execute a specific live process to control the frame buffer to directly transmit the current video data to the downstream transmitter without storing the received current video data.

5. The protocol conversion circuit according to claim 3, further comprising an idle pattern generator, wherein, in response to determining that the second electronic device is the specific type device and determining that the PR function is activated, the control analysis circuit is configured to execute a specific PR process, including:
   controlling the frame buffer to discard the received current video data, and controlling the idle pattern generator to generate idle video data with an idle pattern; and
   updating the previous video data stored in the frame buffer with content within a specified range of the current video data, controlling the frame buffer to transmit the latest video data stored to the downstream transmitter, and controlling the idle pattern generator to generate idle video data with an idle pattern and transmit the idle video data to the downstream transmitter.

6. The protocol conversion circuit according to claim 5, wherein the downstream transmitter is configured to obtain to-be-transmitted video data from one or more of the frame buffer and the idle pattern generator, convert the to-be-transmitted video data into the target signal in the target format and output the target signal to the second electronic device.

7. The protocol conversion circuit according to claim 5, wherein the idle pattern generator is further configured to generate the idle video data with the idle pattern according to horizontal information and vertical information provided by the first electronic device, or generate a minimum power consumption signal.

8. The protocol conversion circuit according to claim 3, wherein, in response to determining that the second electronic device is the specific type device, the downstream transmitter is configured to, when the live function or the PR function is activated, transmit a custom packet to indicate that the second electronic device needs to operate by corresponding to the live function or the PR function.

9. The protocol conversion circuit according to claim 3, wherein the downstream transmitter further includes a PR capability analyzer configured to, in the second handshake process, determine whether or not the second electronic device is the specific type of device according to extended display identification data (EDID) and/or status and control data channel data.

10. A protocol conversion method, comprising:
    configuring a display port (DP) signal receiver to receive a DP signal from a first electronic device, and analyze the DP signal to obtain video data and packet information;
    configuring a frame buffer to receive the video data;
    configuring a control analysis circuit to perform the following steps:
       determining whether the packet information indicates to activate a live function or a panel replay (PR) function;
       in response to determining that the live function is activated, executing a preset live process to control the frame buffer to store current video data received by the frame buffer, and simultaneously send the current video data to a downstream transmitter; and in response to determining that the PR function is activated, executing a preset PR process, including:
controlling the frame buffer to discard the received current video data, or to update previous video data stored in the frame buffer with content within a specified range of the current video data; and
controlling the frame buffer to transmit latest video data stored therein to the downstream transmitter;

configuring the downstream transmitter to, when the live broadcast function is activated, convert the current video data from the frame buffer into a target signal in a target format and output the target signal to the second electronic device, and configuring the downstream transmitter to, when the PR function is activated, convert the latest video data from the frame buffer into the target signal in the target format and output the target signal to the second electronic device.

11. The protocol conversion method according to claim 10, further comprising: in response to the DP signal receiver being connected to the first electronic device, configuring the DP signal receiver to perform a first handshake process with the first electronic device to indicate that the first electronic device supports the PR function under DP specification.

12. The protocol conversion method according to claim 10, further comprising: in response to the downstream transmitter being connected to the second electronic device, configuring the downstream transmitter to perform a second handshake process with the second electronic device, and determine, according to device information from the second electronic device, whether or not the second electronic device is a specific type device.

13. The protocol conversion method according to claim 12, further comprising: in response to determining that the second electronic device is the specific type device and determining that the live function is activated, configuring the control analysis circuit to execute a specific live process to control the frame buffer to directly transmit the current video data to the downstream transmitter without storing the received current video data.

14. The protocol conversion method according to claim 12, further comprising: in response to determining that the second electronic device is the specific type device and determining that the PR function is activated, the control analysis circuit is configured to execute a specific PR process, including:
controlling the frame buffer to discard the received current video data, and controlling the idle pattern generator to generate idle video data with an idle pattern; and
updating the previous video data stored in the frame buffer with content within a specified range of the current video data, controlling the frame buffer to transmit the latest video data stored to the downstream transmitter, and controlling the idle pattern generator to generate idle video data with an idle pattern and transmit the idle video data to the downstream transmitter.

15. The protocol conversion method according to claim 14, further comprising: configuring the downstream transmitter to obtain to-be-transmitted video data from one or more of the frame buffer and the idle pattern generator, convert the to-be-transmitted video data into the target signal in the target format and output the target signal to the second electronic device.

16. The protocol conversion method according to claim 14, wherein the idle pattern generator is further configured to generate the idle video data with the idle pattern according to horizontal information and vertical information provided by the first electronic device, or generate a minimum power consumption signal.

17. The protocol conversion method according to claim 12, further comprising: in response to determining that the second electronic device is the specific type device, configuring the downstream transmitter to, when the live function or the PR function is activated, transmit a custom packet to indicate that the second electronic device needs to operate by corresponding to the live function or the PR function.

18. The protocol conversion method according to claim 12, wherein the downstream transmitter further includes a PR capability analyzer configured to, in the second handshake process, determine whether or not the second electronic device is the specific type of device according to extended display identification data (EDID) and/or status and control data channel data.

* * * * *